United States Patent
Ueyoko et al.

[11] Patent Number: 6,116,311
[45] Date of Patent: Sep. 12, 2000

[54] PNEUMATIC TIRE WITH BAND BETWEEN CARCASS AND BREAKER

[75] Inventors: Kiyoshi Ueyoko, Kobe; Kazuki Numata; Tsuneyuki Nakagawa, both of Shirakawa, all of Japan

[73] Assignee: Sumitomo Rubber Industries, Ltd., Hyogo-ken, Japan

[21] Appl. No.: 09/105,182

[22] Filed: Jun. 26, 1998

[30] Foreign Application Priority Data

Jun. 27, 1997 [JP] Japan ................................. 9-172287

[51] Int. Cl.[7] .................. B60C 9/18; B60C 9/20; B60C 9/22
[52] U.S. Cl. ................. 152/531; 152/533; 152/538; 156/117
[58] Field of Search ..................... 152/531, 533, 152/534, 538; 156/117

[56] References Cited

U.S. PATENT DOCUMENTS

| | | | |
|---|---|---|---|
| 3,598,166 | 8/1971 | Wells | 152/533 X |
| 3,677,319 | 7/1972 | Mirtain | 152/531 X |
| 3,720,569 | 3/1973 | Kimble | 152/533 X |
| 4,244,415 | 1/1981 | Peter et al. | 152/531 |
| 4,702,293 | 10/1987 | Iwata et al. | 152/531 |
| 4,934,429 | 6/1990 | Koseki et al. | 152/531 X |
| 4,934,430 | 6/1990 | Koseki et al. | 152/531 X |
| 5,383,507 | 1/1995 | Sato et al. | 152/533 X |
| 5,385,193 | 1/1995 | Suzuki et al. | 152/533 X |

FOREIGN PATENT DOCUMENTS

| | | | |
|---|---|---|---|
| 0 501 782 A2 | 9/1992 | European Pat. Off. | 152/533 |
| 8-216618 | 8/1996 | Japan | 152/533 |
| 1 487 426 | 9/1977 | United Kingdom | 152/533 |

*Primary Examiner*—Adrienne C. Johnstone
*Attorney, Agent, or Firm*—Birch, Stewart, Kolasch & Birch

[57] ABSTRACT

A pneumatic tire comprises a breaker disposed radially outside a carcass and having a cord angle of not less than 10 degrees, and a band disposed between the carcass and the breaker and having a cord angle of less than 10 degrees, the breaker having a double-layered cord structure comprising a radially outer layer and a radially inner layer between which the cord inclination is reversed, the band being made of spiral windings of at least one cord; and the breaker is preferably formed by continuously winding at least one cord zigzag around the radially outside of the band plural times, in each turn the tape being bent at the axial edges of the breaker.

4 Claims, 8 Drawing Sheets

PNEUMATIC TIRE WITH BAND BETWEEN CARCASS AND BREAKER

BACKGROUND OF THE INVENTION

1. Field of the Invention

The present invention relates to a pneumatic tire having an improved belt structure being capable of decreasing the tire weight without decreasing the tire strength and the belt hooping effect.

2. Description of the Related Art

As an approach to the environmental problems such as global warming and air pollution, it is a main theme to improve automobiles' fuel consumption. For the tires, therefore, it is very important to decrease the weight, which is especially true of pneumatic tires for heavy duty vehicles such as trucks and buses.

Nowadays, radial tires are widely used, and the radial tires are provided radially outside the carcass (a) with a breaker (b) as shown in FIG. 10 to reinforce the tread portion. In general, the breaker for heavy duty radial tires is composed of four cut-end plies (b1–b4) of rubberized parallel cords (c) to provide a necessary strength for the tread portion. If the number of the cut-end plies is decreased, it is difficult for the tire to pass a strength test. Here, the strength (hereinafter, plunger strength) corresponds to the so called plunger energy obtained by the method specified in Japanese Industrial Standard D4230.

On the other hands, if the inclination angle of the breaker cords to the tire equator C is increased, the envelope effect is enhanced at the sacrifice of the hooping effect. Therefore, there are some instances where the necessary plunger strength can be barely obtained by increasing the inclination angle even if the breaker ply number is decreased. In this case, however, a tire growth, especially, a partial growth greater in the tread crown portion is inevitable because of the decreased hooping effect.

SUMMARY OF THE INVENTION

It is therefore an object of the present invention to provide a pneumatic tire in which the tire weight is decreased without decreasing the plunger strength and at the same time the above-mentioned unfavorable tire growth can be prevented.

According to one aspect of the present invention, a pneumatic tire comprises a carcass comprising at least one ply of cords arranged radially at an angle of from 70 to 90 degrees with respect to the tire equator, a breaker disposed radially outside the carcass in a tread portion, the breaker having a layered cord structure comprising a radially outer layer and a radially inner layer wherein with respect to the circumferential direction of the tire the cord inclination is reversed between the radially outer layer and the radially inner layer and the cord angle is not less than 10 degrees, and a band disposed between the carcass and the breaker, the band made of spiral windings of at least one cord, of which cord angle is less than 10 degrees with respect to the circumferential direction of the tire.

An embodiment of the present invention will now be described in detail in conjunction with the accompanying drawings.

DETAILED DESCRIPTION OF THE INVENTION

Figure 1:
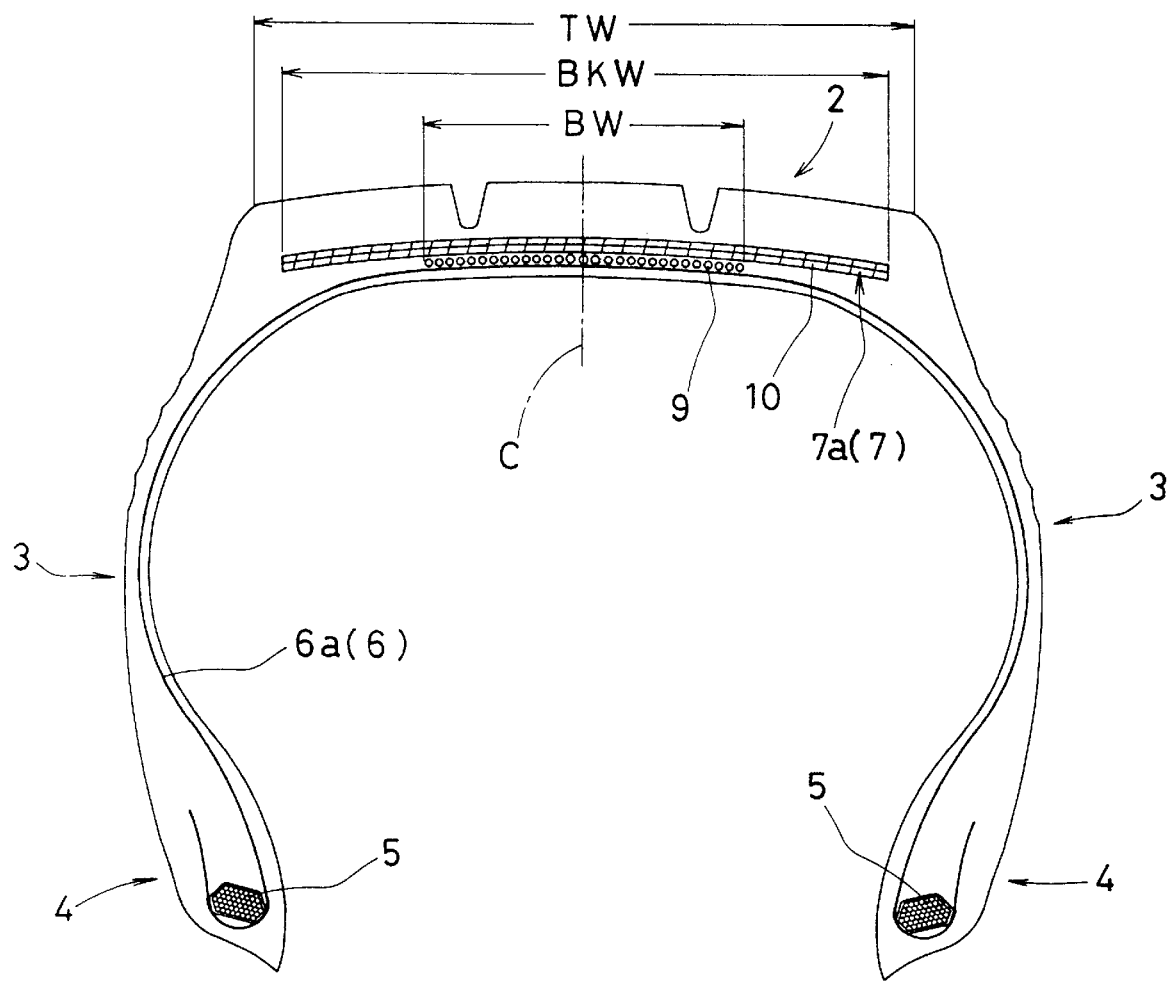
FIG. 1 is a cross sectional view of an embodiment of the present invention.

In FIG. 1, the tire of the present invention is a heavy duty radial tire accommodated to a 15 degree taper center drop rim.

The tire comprises a tread portion 2, a pair of axially spaced bead portions 4 with a bead core 5 therein, a pair of sidewall portions 3 extending between the tread edges and the bead portions 4, a carcass 6 extending between the bead portions 4, and a tread reinforcing belt 7, 9 disposed radially outside the carcass 6 and inside a tread rubber.

The carcass 6 is composed of at least one ply 6a of cords 6c arranged radially at an angle in the range of from 70 to 90 degrees to the tire equator C and extending between the bead portions 4 through the tread portion 2 and sidewall portions 3 and turned up around the bead core 5 in each of the bead portions 4 to be secured thereto. In this example, the carcass 6 consists of a single ply 6a turned up around the bead cores 5 from the inside to the outside of the tire. For the carcass cords 6c, steel cords are used in this example. However, organic fiber cords, e.g. polyester, nylon, rayon, aromatic polyamide and the like can be used alone or in combination with steel cords.

The above-mentioned belt is composed of a band 9 and a breaker 7.

The band 9 is disposed on the radially outside of the carcass 6 and composed of spiral windings of at least one cord 13. The cord angle thereof is in the range of less than 10 degrees and preferably less than 5 degrees to the tire circumferential direction. In this example, the angle is substantially zero. The axial width BW of the band 9 is set in the range of from 0.2 to 0.8 times the tread width TW.

For the band cord 13, steel cords or high modulus organic fiber cords such as aromatic polyamide cords are preferably used. However, relatively low modulus organic fiber cords such as nylon, polyester and the like may be used.

In this example, the band 9 is formed by spirally winding a tape 14 continuously from one edge to the other edge of the band 9 so that the edges 14a of the tape 14 abut each other. The tape 14 will be described later on.

Here, the tread width TW is the maximum axial width of the ground contacting area under a standard condition in which the tire is mounted on a standard rim and inflated to a standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The breaker 7 is disposed on the radially outside of the band 9 and has a double-layered cord structure comprising a radially inner layer and a radially outer layer, wherein the cord inclination of the radially inner layer is opposite to the cord inclination of the radially outer layer with respect to the tire equator. The inclination angle θ is preferably in the range of from 10 to 35 degrees, more preferably 10 to 20 degrees. The axial width BKW of the breaker 7 is preferably set in the range of from 0.8 to 1.0 times the tread width TW.

The breaker 7 may be formed by winding strips of rubberized parallel cords one upon another.

Figure 2:
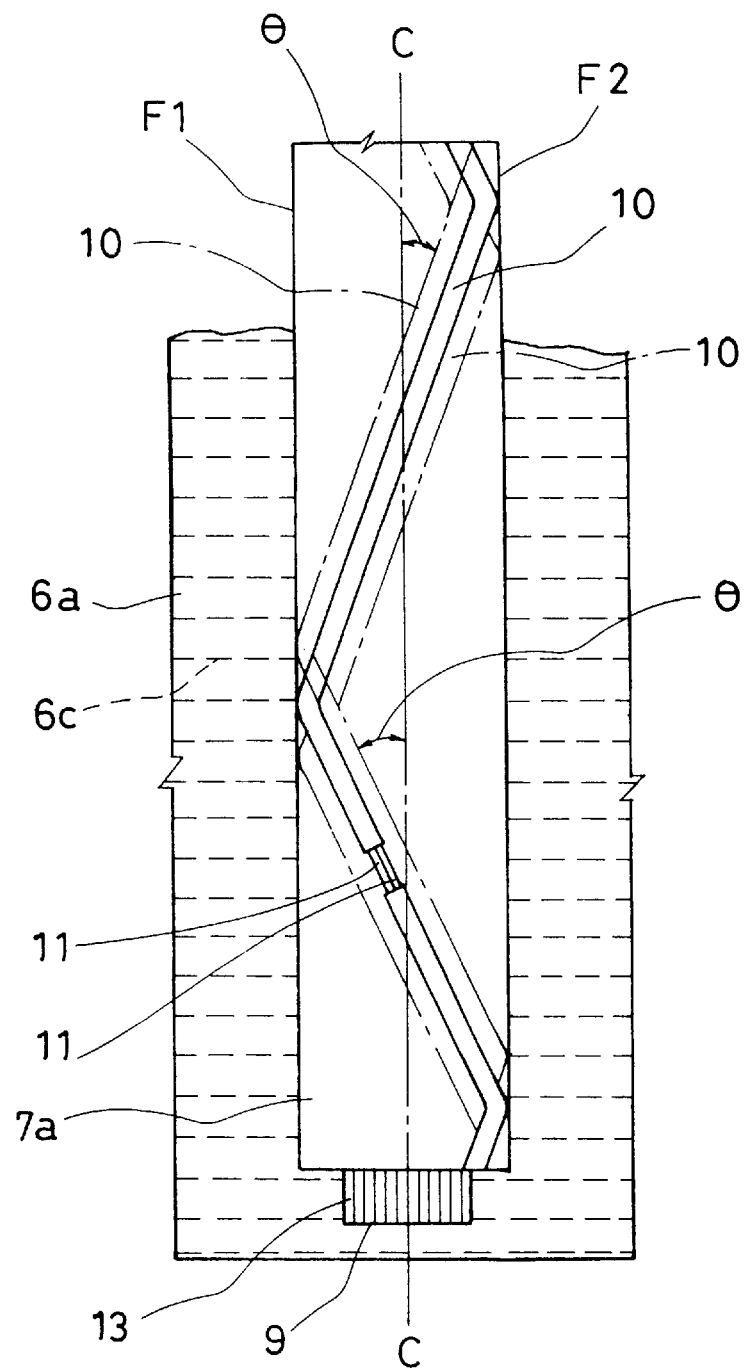
FIG. 2 is a developed schematic plan view showing an arrangement of the carcass, band and breaker wherein one of zigzag windings of a tape is shown but the others are omitted.
Figure 3:
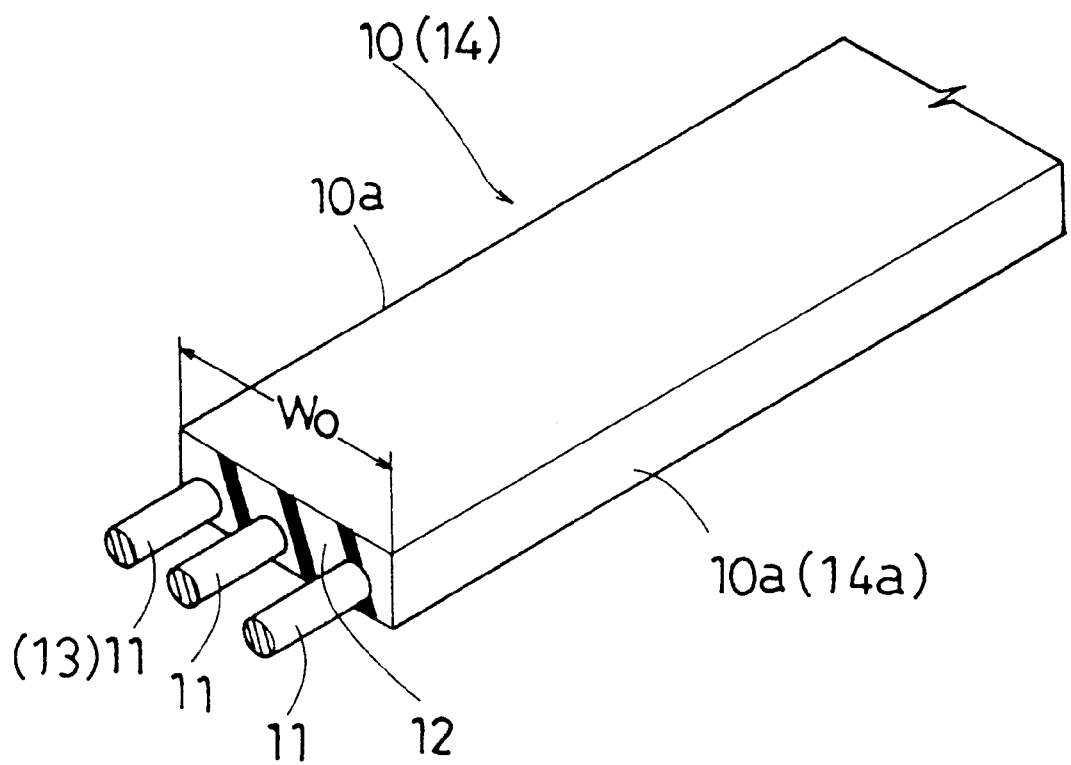
FIG. 3 is a perspective view of the tape used to make the breaker and band.
Figure 4:
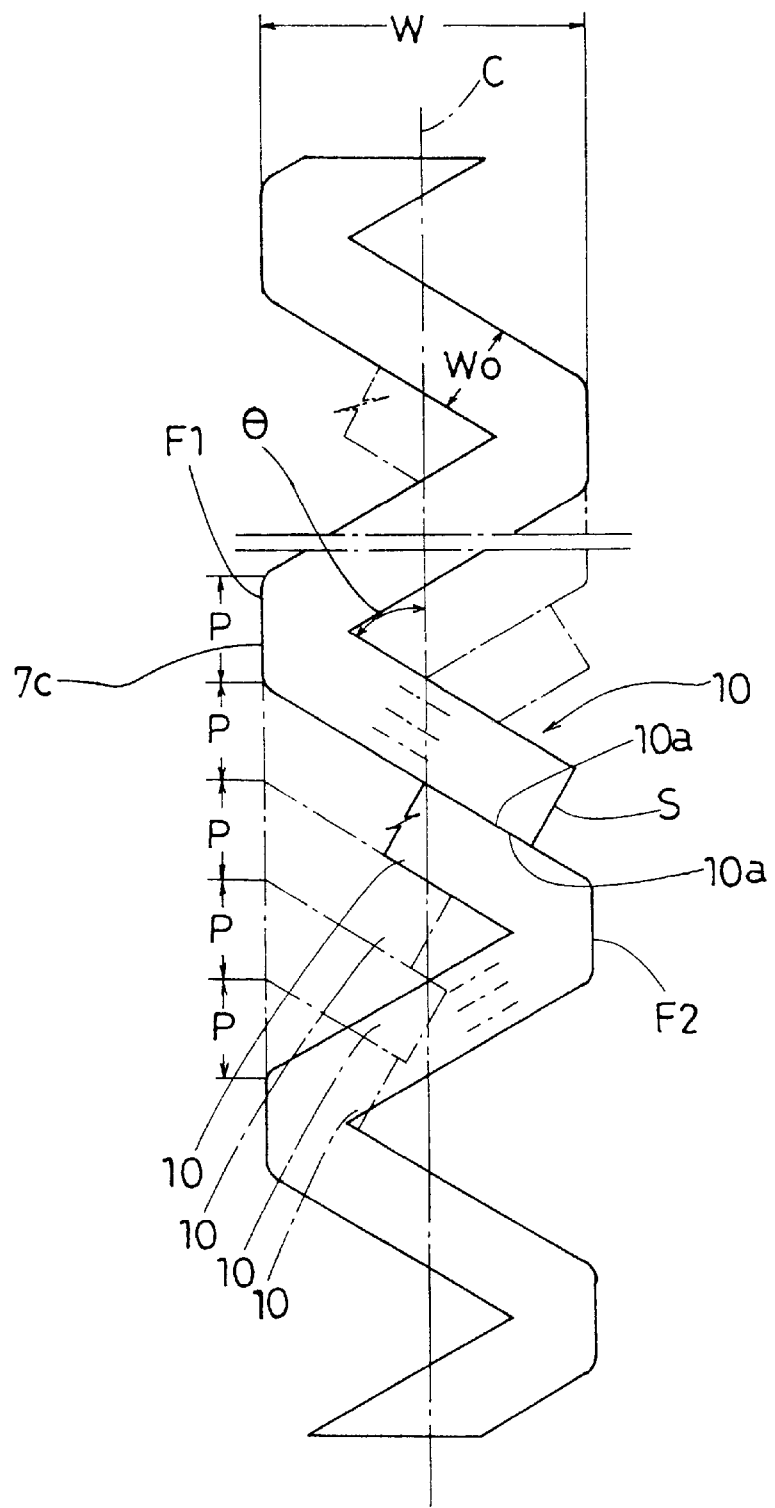
FIG. 4 is a diagram for explaining the bends of the zigzag tape.

In this embodiment, however, as shown in FIGS. 2 to 4, the breaker 7 is formed by continuously winding a tape 10 zigzag around the radially outside of the band 9 plural times. As a result, the resistance to breaker edge loosening effectively increase to improve the durability.

In each turn or winding, the tape 10 is bent (FIG. 4) or folded (not shown) at the edges F1 and F2 of the breaker 7. Between the edges F1 and F2, the tape extends substantially straight at the angle θ with respect to the tire equator C. Hereinafter, the straight parts of the tape extending from one edge F1 to the other edge F2 are called oblique segments. The number of the bends at both edges F1 and F2 per one turn is set in the range of from two to six. In other words, when the number of the bends is two for example, the tape is bent every 180 (=360/2) degrees around the axis of the tire. When the number is six, the tape is bent every 60 (=360/6) degrees. As a result, it becomes possible to set the cord angle θ at a certain value in the range of from about 10 to 40 degrees.

Strictly speaking, however, the number of the bends can not be an exact integer because each of the windings must be shifted from the previous winding in one circumferential direction to form a uniform double-layered structure, wherein the radially outer layer is composed of first oblique segments, and the radially inner layer is composed of second oblique segments, the first oblique segments being inclined in the same direction and the second oblique segments being inclined in the same direction which is however reverse to that of the first oblique segments.

In each layer or ply 7a, except for the edge portions, the cord or cords are inclined at the angle θ in one direction. As mentioned above, the angle θ is preferably in the range of from 10 to 35 degrees, more preferably 10 to 20 degrees. If the angle θ is less than 10 degrees, the lateral rigidity of the belt becomes insufficient for producing a necessary cornering force. If more than 35 degrees, the hooping force to the carcass 6 is liable to become insufficient.

The above-mentioned tape 10 and 14 are, as shown in FIG. 3, a tape of rubber 12 in which a single cord or parallel cords are embedded along the longitudinal direction thereof. Preferably, a tape in which 2 to 10 belt cords 11, 13 are embedded is used, but it is also possible to use a tape with a single cord therein. The tapes 10 and 14 have a substantially rectangular sectional shape, and the width Wo thereof is preferably set in the range of from 5 to 15 mm.

In this embodiment, the band cord 13 and breaker cord 11 are materially the same, but the diameters are different. To put it more concretely, steel cords are used and the diameter of the band cord 13 is less than that of the breaker cord 11.

Between the band and breaker, the cords may be differed in respect of the material, diameter. twist structure, elongation and the like. Further, it is also possible to use the same cords.

The band 9 and breaker 7 can be manufactured by winding the tape directly on the radially outer surface of the carcass. In practice, however, they are manufactured separately from the carcass for example by winding the tape on the cylindrical surface of a belt building drum to improve the production efficiency as well as the dimensional accuracy.

Further, it is possible to make the band 9 and breaker 7 by winding one tape continuously from the band to the breaker, for example using a tape in which two to four steel cords are embedded.

Figure 5:
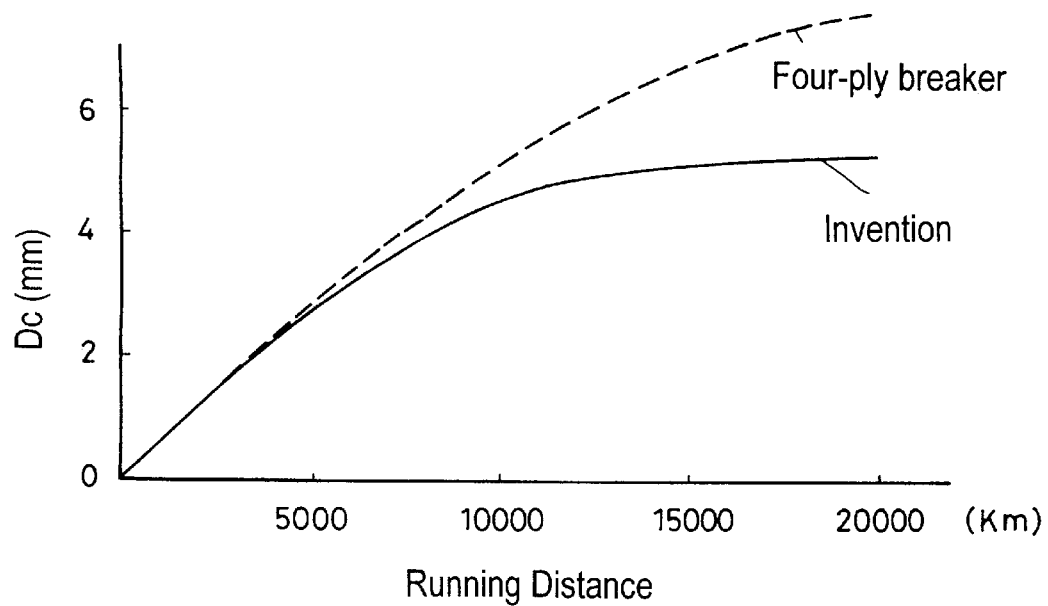
FIG. 5 is a graph showing variations of tire diameter at the tire equator as a function of the running distance.
Figure 6:
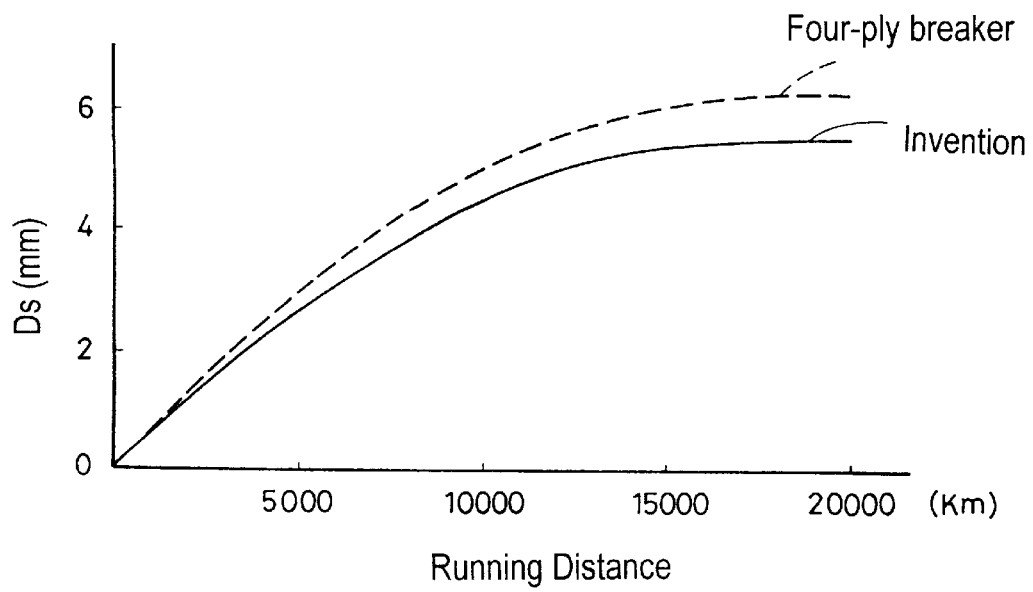
FIG. 6 is a graph showing variations of tire diameter at the tire shoulder as a function of the running distance.
Figure 7:
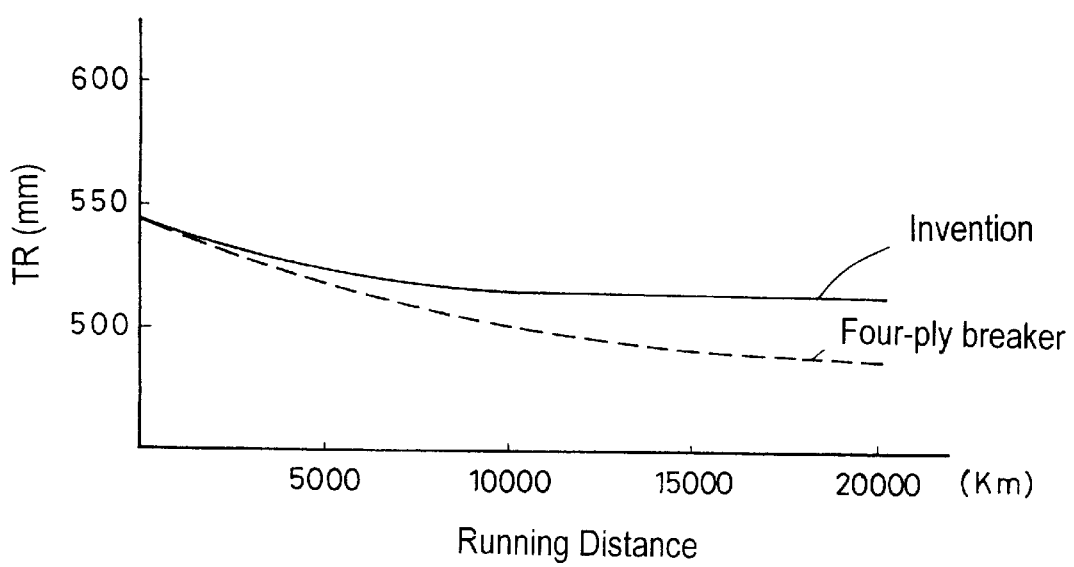
FIG. 7 is a graph showing variations of radius of curvature in the tread crown portion as a function of the running distance.

FIGS. 5 to 7 show the results of comparison tests. The test tires were heavy duty radial tires of size 11R22.5 including: the tire according to the invention provided with the above-explained belt structure composed of the double-layered breaker and single-layered band; and a reference tire provided with the conventional four-ply breaker shown in FIG. 10. In FIG. 5, the variations of the tire diameter measured at the equator are shown as a function of the running distance. In FIG. 6, the variations of the tire diameter measured in the shoulder portion at the breaker edge position are shown as a function of the running distance. In FIG. 7, the variations of the radius TR of curvature of the tread crown portion are shown as a function of the running distance. As shown in FIGS. 5–7, the variations of the tire according to the invention can be decreased in comparison with the reference tire, though the belt ply number is less than that of the reference tire.

Figure 8:
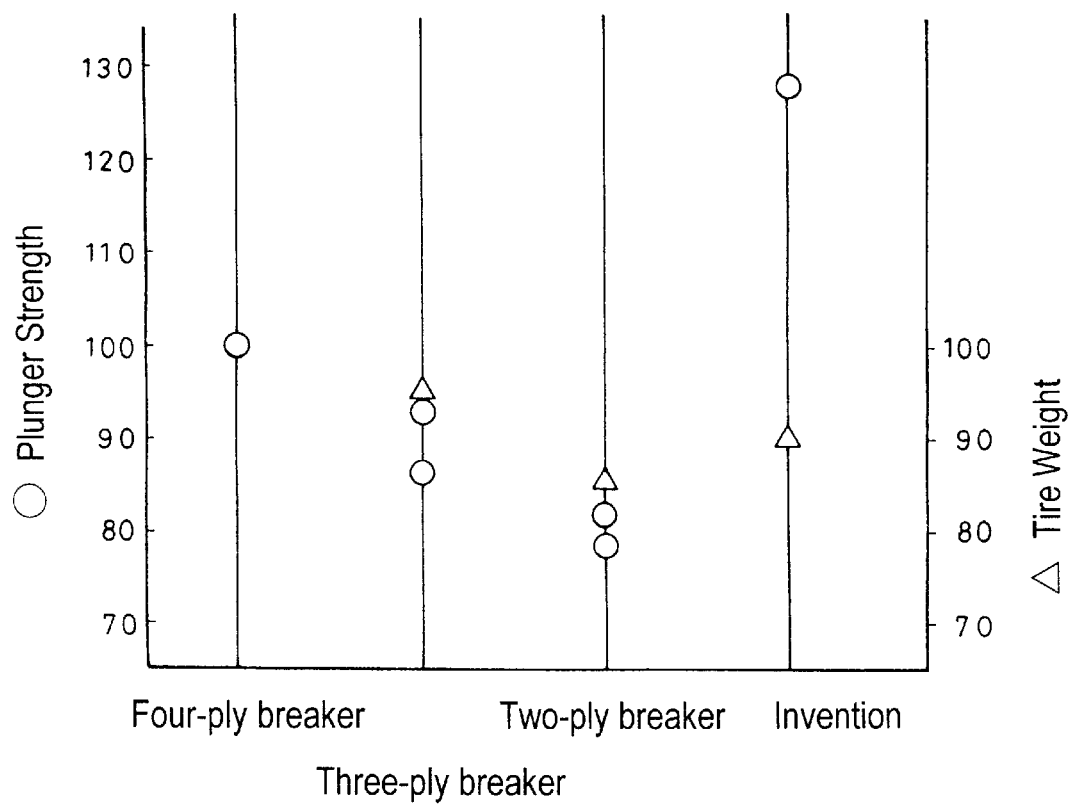
FIG. 8 is a graph showing relationships between the plunger strength and tire weight.

FIG. 8 shows the tire weight and plunger strength of each of the four-breaker-ply tire according to the invention and the reference tire having the conventional four-ply breaker and further a reference tire having three breaker plies and a reference tire having two breaker plies. In FIG. 8, the plunger strength and tire weight are indicated by an index based on the four-breaker-ply tire being 100. Although the tire weight is less than that of the four-breaker-ply tire, the plunger strength of the tire of the present invention can be greatly improved.

Figure 9:
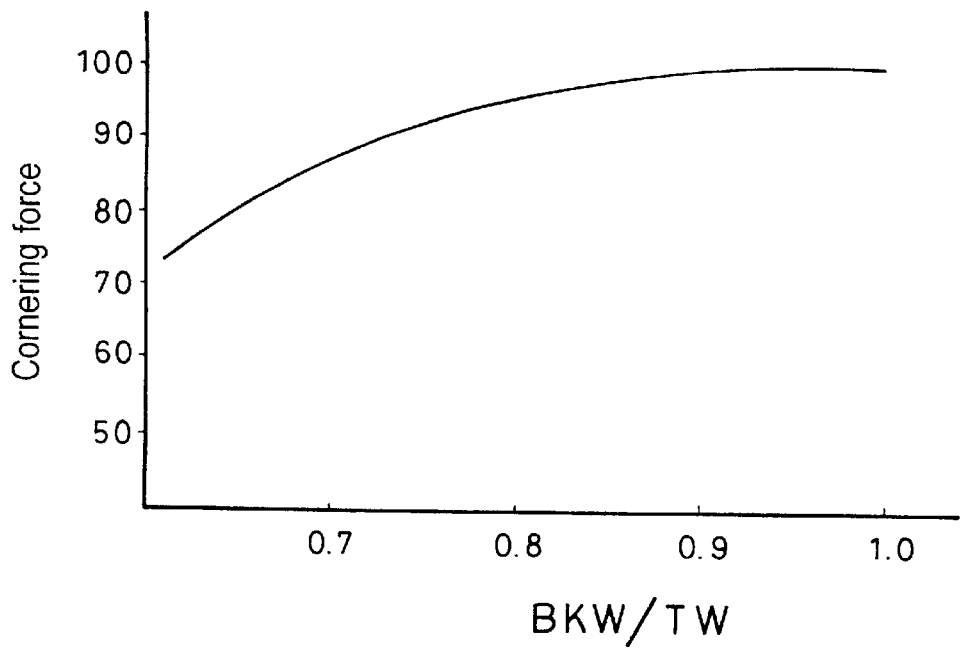
FIG. 9 is a graph showing a relationship between the BKW/TW ratio and cornering force.

FIG. 9 shows the cornering force as a function of the breaker width BKW when the band width BW is set at a constant value of 0.5 times the tread width TW. If the breaker width BKW is less than 0.8 times the tread width TW, the cornering force greatly decreases to deteriorate the steering stability. If the breaker width BKW is more than 1.0 times the tread width TW, the tread rubber thickness at the breaker edges decreases to deteriorate the durability.

If the band width BW is less than 0.2 times the tread width TW, the hooping force is insufficient for preventing the tread deformation. If the width BW is more than 0.8 times the tread width TW, it is difficult to achieve a significant weight reduction. Further, a problem of uneven tread wear is liable to arise.

The band width BW is set in the range of from 0.2 to 0.8 times, more preferably 0.2 to 0.5 times the tread width TW.

If the band 9 is disposed radially outside the breaker 7, the plunger strength decreases, and it becomes difficult to pass the plunger strength test. Further, the cornering force decreases to deteriorate the steering stability.

If the band 9 is composed of a single winding of a strip of rubberized parallel cords, the hooping force to the carcass 6 is liable to decrease due to the splicing of the strip ends, and the durability is decreased.

Comparison Test

Heavy duty radial tires of size 11R22.5 were made and tested for the tire weight, tire growth, plunger strength and durability. The tire specifications and test results are given in Table 1.

Tire Weight Test

The tire weight is measured and indicated in Table 1 by an index based on the conventional tire being 100, wherein the smaller the index, the lighter the tire weight.

Tire Growth Test

After running for 20,000 km on a tire drum, the difference Dc of the tire diameter at the tire equator, the difference Ds of the tire diameter at the breaker edge and the difference Rc of the radius of curvature of the tread crown portion each from that measured before running were calculated.

Wheel rim: 7.50×22.5 standard rim

Inner pressure: 850 kPa

Tire load: 2680 kgf

Running speed: 80 km/h

Plunger Strength Test

The plunger strength was measured according to Japanese Industrial Standard D4230. The results are shown in Table 1 by an index based on the conventional tire being 100, wherein the larger the index, the higher the strength.

Wheel rim: 7.50×22.5 standard rim

Inner pressure: 700 kPa

Durability Test

The test tire was run on a tire drum and the running speed was increased every three hours at a step of 10 km/h from 80 km/h. When any visible damage was found during running, the running test was stopped, and the total running time was measured. The results are shown in Table 1 by an index based on the conventional tire being 100, wherein the larger the index, the higher the durability.

Wheel rim: 7.50×22.5 standard rim

Inner pressure: 850 kPa

Tire load: 4000 kgf

From the test results, it was confirmed that the tire according to the invention can be remarkably improved in the strength and durability though the tire weight is decreased, and the dimensional stability is effectively improved.

TABLE 1

Figure 10:
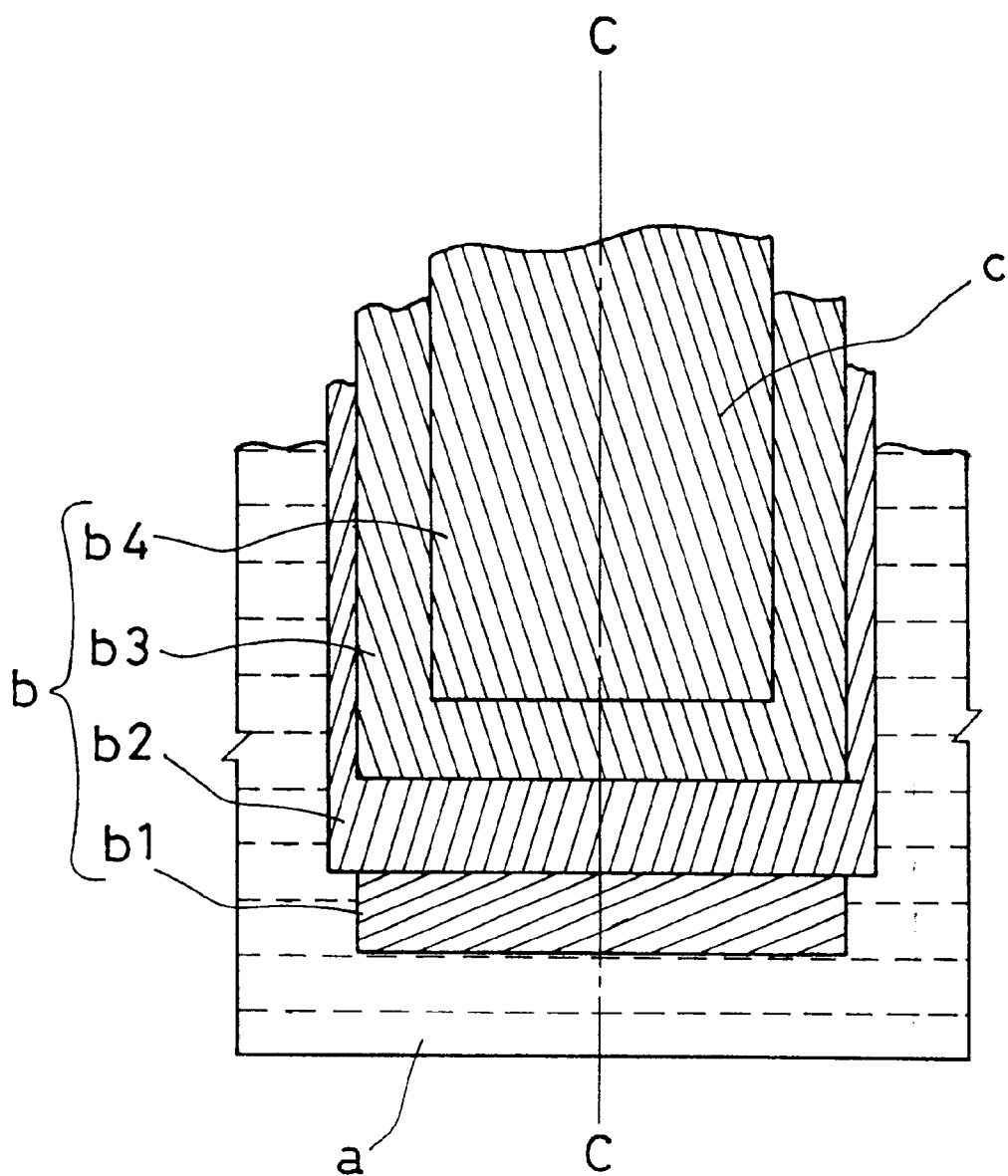
FIG. 10 is a developed plan view showing a conventional belt arrangement for heavy duty radial tires.

| Tire | Conventional | Ex. 1 | Ref. 1 | Ref. 2 |
| --- | --- | --- | --- | --- |
| Carcass | | | | |
| No. of ply | 1 | | | |
| Cord | steel cord (3 × 0.20 + 7 × 0.23) | | | |
| Cord angle | 90 degrees to tire equator | | | |
| Cord count | 38 ends/5 cm | | | |
| Breaker | | | | |
| No. of layer | 4 | 2 | 2 | 2 |
| Structure | Fig. 10 | Fig. 2 | cut-end ply | Fig. 2 |
| Cord angle (deg) | +67/ +18/−18/−18 | +18/−18 | +18/−18 | +18/−18 |
| Cord | steel cord (3 × 0.20 + 6 × 0.35) | | | |
| Cord count | 26/5 cm | | | |
| Band | | | | |
| No. of layer | — | 1 | — | — |

TABLE 1-continued

| Tire | Conventional | Ex. 1 | Ref. 1 | Ref. 2 |
| --- | --- | --- | --- | --- |
| Cord material | — | steel (3 × 0.17 + 7 × 0.20) | — | — |
| Cord angle | | 0 degree | | |
| Cord count | | 40/5 cm | | |
| Test results | | | | |
| Tire weight | 100 | 93 | 90 | 90 |
| Dc (mm) | 5 | 3 | 8 | 7 |
| Ds (mm) | 4 | 2 | 5 | 4 |
| Rc (mm) | 25 | 15 | 40 | 35 |
| Strength | 100 | 130 | 77 | 77 |
| Durability | 100 | 120 | 90 | 120 |

What is claimed is:

1. A pneumatic tire comprising a carcass comprising at least one ply of cords arranged radially at an angle of from 70 to 90 degrees with respect to the tire equator, a breaker disposed radially outside the carcass in a tread portion, the breaker having a layered cord structure comprising a radially outer layer and a radially inner layer wherein with respect to the circumferential direction of the tire the cord inclination is reversed between the radially outer layer and the radially inner layer and the cord angle is not less than 10 degrees, and a band having a single-layered cord structure disposed between the carcass and the breaker, the band made of spiral windings of at least one cord, of which cord angle is less than 10 degrees with respect to the circumferential direction of the tire, the axial width of the breaker being in the range of from 0.8 to 1.0 times the width of the tread, the axial width of the band being in the range of from 0.2 to 0.5 times the width of the tread, said band and breaker being formed by winding a single continuous tape, the tape being of rubber in which a single cord or plurality of parallel cords are embedded along the longitudinal direction thereof, in said band, the tape being wound spirally around the carcass, but in said breaker, the tape being wound zigzag around the radially outside of the band plural times, while bending at axial edges of the breaker in each turn, so that the breaker has a double-layered cord structure, wherein radially outer cord segments in the radially outer layer are inclined in a same first direction, and radially inner cords segments in the radially inner layer are inclined in a same second direction which is reverse to the first direction of the outer cord segments.

2. The pneumatic tire according to claim 1, wherein each cord in said tape is made of steel, polyester, nylon, or aromatic polyamide.

3. The pneumatic tire according to claim 1, wherein 2 to 10 of the parallel cords are embedded in said tape.

4. The pneumatic tire according to claim 1, wherein the tape bent at the axial edges of the breaker forms bends, and a number of the bends per turn around the tire is from 2 to 6.

* * * * *